United States Patent
Breuer et al.

(10) Patent No.: US 8,195,373 B2
(45) Date of Patent: Jun. 5, 2012

(54) VEHICLE DRIVER ASSISTANCE SYSTEM AND METHOD

(75) Inventors: Karsten Breuer, Lauenau (DE); Thomas Dieckmann, Pattensen (DE); Guido Hoffman, Hannover (DE)

(73) Assignee: WABCO GmbH, Hannover (DE)

(*) Notice: Subject to any disclaimer, the term of this patent is extended or adjusted under 35 U.S.C. 154(b) by 427 days.

(21) Appl. No.: 12/317,111

(22) Filed: Dec. 19, 2008

(65) Prior Publication Data

US 2009/0177347 A1 Jul. 9, 2009

(30) Foreign Application Priority Data

Jan. 4, 2008 (DE) .................. 10 2008 003 194

(51) Int. Cl.
- B60T 7/12 (2006.01)
- G05D 1/00 (2006.01)
- G06F 7/00 (2006.01)
- G06F 17/00 (2006.01)

(52) U.S. Cl. ............... 701/96; 701/70; 701/93; 701/97; 701/300; 701/301; 180/170

(58) Field of Classification Search ............ 701/53, 701/58, 70, 93, 300, 301
See application file for complete search history.

(56) References Cited

U.S. PATENT DOCUMENTS

| | | | | |
|---|---|---|---|---|
| 5,678,650 | A * | 10/1997 | Ishihara et al. | 180/169 |
| 6,076,622 | A * | 6/2000 | Chakraborty et al. | 180/169 |
| 6,259,992 | B1 * | 7/2001 | Urai et al. | 701/301 |
| 6,311,120 | B1 * | 10/2001 | Asada | 701/96 |
| 6,769,504 | B2 * | 8/2004 | Kobayashi et al. | 180/169 |
| 7,706,954 | B2 * | 4/2010 | Michi et al. | 701/96 |

* cited by examiner

*Primary Examiner* — Hussein Elchanti
*Assistant Examiner* — Rami Khatib
(74) *Attorney, Agent, or Firm* — Kramer Levin Naftalis & Frankel LLP

(57) ABSTRACT

A driver assistance system includes a sensor for sensing the speed of a first vehicle equipped with the system, a sensor for detecting a vehicle traveling ahead, a sensor for determining the speed of the vehicle ahead, at least one driving-data sensor for sensing driving data characteristics, and an electronic controller programmed to trigger autonomous braking of the first vehicle when predetermined brake-trigger driving data exist, and to end the autonomous braking when predetermined driving data for terminating braking exist. In effecting termination of autonomous braking, the electronic controller is programmed to determine whether the sensor for detecting vehicles ahead is transmitting signals (i.e., is operational) but is not detecting any vehicle traveling ahead, and, if the sensor is operational and no vehicle traveling ahead is detected, to terminate autonomous braking when the speed of the first vehicle is less than the most recently determined speed of the vehicle ahead.

15 Claims, 1 Drawing Sheet

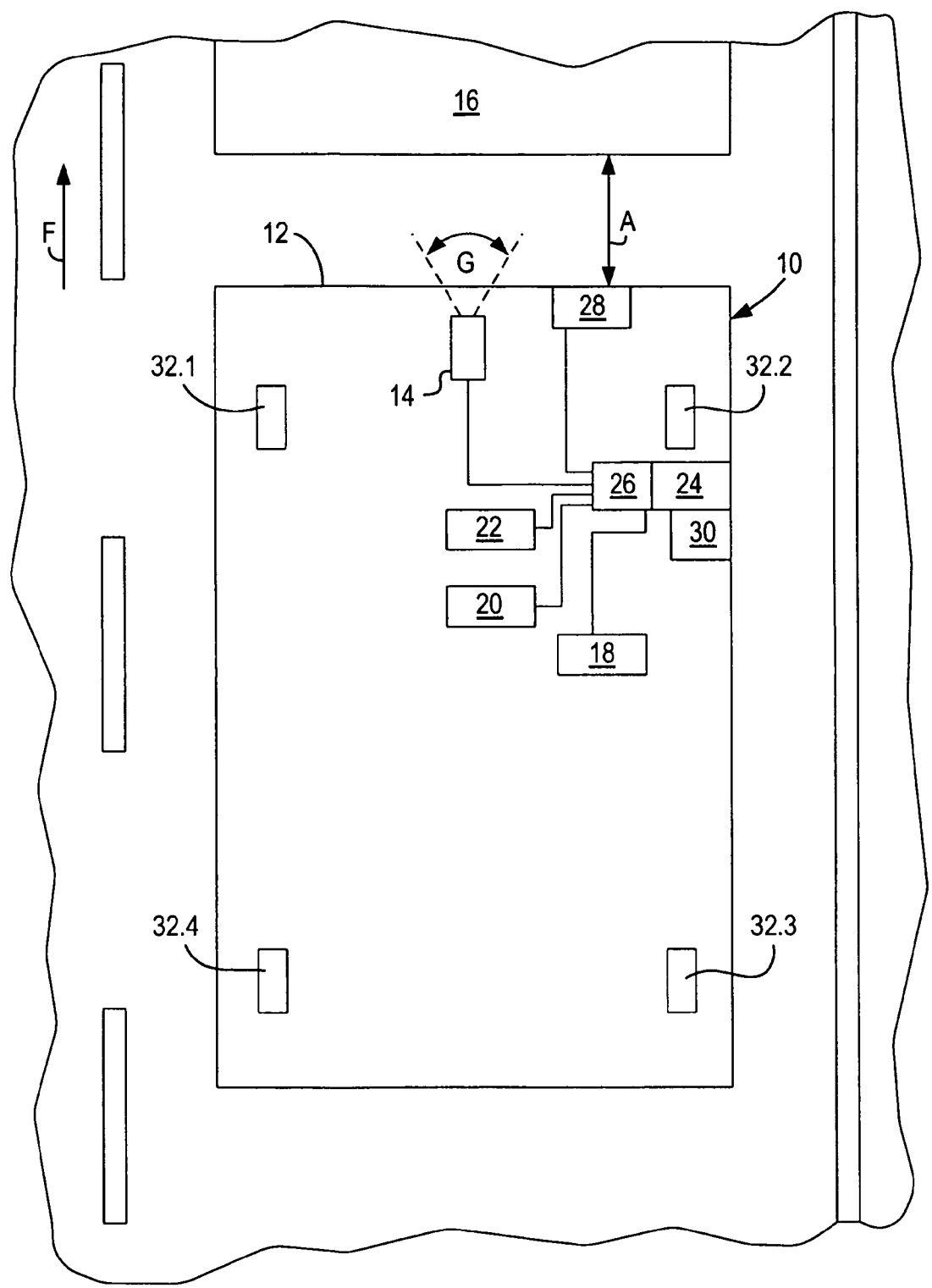

VEHICLE DRIVER ASSISTANCE SYSTEM AND METHOD

FIELD OF THE INVENTION

The present invention generally relates to an improved vehicle driver assistance system and method.

BACKGROUND OF THE INVENTION

Driver assistance systems, especially for trucks, are used to reduce the severity of accidents or to avoid accidents entirely through autonomous braking—which may also be partial braking—shortly before any impending collision with vehicles traveling ahead. In order to generate the necessary signals for triggering the autonomous braking, a sensing device for detecting vehicles traveling ahead is utilized.

A disadvantage of conventional driver assistance systems is that autonomous braking can be prematurely terminated. This can increase the danger of collision and the intensity of any collision.

SUMMARY OF THE INVENTION

Generally speaking, the present invention provides an improved vehicle driver assistance system and method which overcome disadvantages associated with conventional driver assistance systems.

In accordance with embodiments of the present invention, a vehicle driver assistance system (which, for ease of discussion, will hereinafter be described in the context of a truck implementation, but is not necessarily limited to truck implementations, as the inventive driver assistance system can have application in a variety of vehicle types) includes (a) a sensor for sensing the speed of the truck, (b) a sensor for detecting a vehicle traveling ahead of and in the path of the truck, (c) a sensor for determining the speed of the vehicle traveling ahead, (d) at least one driving-data sensor for sensing driving data characteristics of a driving condition of the truck, and (e) an electronic controller programmed (or hard-wired) to trigger autonomous braking of the truck when predetermined brake-trigger driving data exist, and to end the autonomous braking when predetermined driving data for terminating braking exist. In terminating autonomous braking, the electronic controller is further programmed (or hard-wired) to ascertain whether the sensor for detecting vehicles traveling ahead is transmitting signals (i.e., is operational) but is not detecting any vehicle traveling ahead, and, if the sensor is, indeed, operational and no vehicle traveling ahead is detected, to terminate autonomous braking when the truck's speed is less than the most recently determined speed of a vehicle traveling ahead (which can be before the truck is brought to a standstill).

Accordingly, it is an object of the present invention to provide a vehicle driver assistance system and method that avoid premature termination of autonomous braking.

Still other objects and advantages of the present invention will in part be obvious and will in part be apparent from the specification.

The present invention accordingly comprises the several steps and the relation of one or more of such steps with respect to each of the others, and embodies features of construction, combination of elements, and arrangement of parts which are adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawing in which:

FIG. 1 is a schematic view of a truck equipped with a driver assistance system in accordance with an embodiment of the present invention.

DETAILED DESCRIPTION OF THE PREFERRED EMBODIMENTS

A vehicle (e.g., truck) driver assistance system in accordance with embodiments of the present invention includes (a) a sensor for sensing the speed of the truck, (b) a sensor for detecting a vehicle traveling ahead of and in the path of the truck, (c) a sensor for determining the speed of the vehicle traveling ahead, (d) at least one driving-data sensor for sensing driving data characteristics of a driving condition of the truck, and (e) an electronic controller adapted (i.e., programmed or hard-wired) to trigger autonomous braking of the truck when predetermined brake-trigger driving data exist, and to end the autonomous braking when predetermined driving data for terminating braking exist. In effecting the termination of autonomous braking, the electronic controller is further adapted to effect the steps of (i) ascertaining whether the sensor for detecting vehicles traveling ahead is transmitting signals (i.e., is operational) but is not detecting any vehicle traveling ahead, and, if the sensor is operational and no vehicle traveling ahead is detected, (ii) ending autonomous braking when the truck's speed is less than the most recently determined speed of a vehicle ahead.

An advantage of the inventive system and method is that roll, yaw and/or pitch do not lead to the undesired termination of autonomous braking. In particular, trucks frequently roll, yaw and/or pitch so strongly during autonomous braking that the sensor for detecting vehicles traveling ahead may no longer carry out its function. In such an already critical situation it is advantageous to continue autonomous braking until the speed of the truck is less than the most recently determined speed of the vehicle ahead. The reduction in the truck's kinetic energy can either enable the truck to avoid a collision with a vehicle ahead or lessen the severity of a collision.

If the process steps effected by the controller in accordance with the present invention are continually repeated at short time intervals, such as, for example, less than one tenth of one second, braking can be terminated immediately after the truck's speed has dropped below the most recently determined speed of a vehicle ahead, i.e., before the truck is brought to a standstill. In this way, the truck is not braked to a standstill if the vehicle ahead has braked heavily but only for a short time and then, for example, changes lanes, ends its braking or accelerates.

The sensor for sensing the speed of the truck can be a tachometer or tachograph, for example.

The sensor for detecting a vehicle traveling ahead of and in the path of the truck can be any sensor that is suited to the task. Preferably, this sensor can additionally sense data from which the speed of the vehicle traveling ahead relative to the truck can be determined—e.g., by measuring the distance from the truck to the vehicle ahead at regular time intervals. This sensor can comprise a multi-beam laser sensor, for example. Alternatively or additionally, this sensor can comprise a video camera. If both a video camera and a laser sensor are utilized, salutary redundancy can be achieved.

The sensor for determining the speed of the vehicle traveling ahead should be capable of receiving electrical signals from the sensor for sensing the speed of the truck (speed data) and the sensor for detecting the vehicle traveling ahead (time-dependent distance data), respectively, and of calculating therefrom the speed of the vehicle traveling ahead. Thus, the speed of the vehicle traveling ahead can be obtained as the vector sum of the vehicle speed and the relative speed between the truck and the vehicle traveling ahead (the relative speed can be sensed by means of a radar sensor using the Doppler effect). The sensor for determining the speed of the vehicle traveling ahead can, but need not be, part of the electronic controller.

As discussed above, the driver assistance system according to embodiments of the present invention includes one or more driving-data sensors. In addition to the sensor for determining the truck's speed (e.g., a tachometer), the driving-data sensor(s) can include yaw-rate and deceleration/acceleration sensors, as well as video cameras and laser sensors.

As indicated above, the electronic controller determines whether the sensor for detecting a vehicle traveling ahead is transmitting signals. This means that the controller is adapted (i.e., programmed or hard-wired) to determine whether this sensor is functioning properly and is not functionally impaired. That is, to prove that the sensor for detecting a vehicle ahead is transmitting signals, it is merely necessary that this sensor is capable in principle of detecting the vehicle ahead even if, due to roll, yaw and/or pitch of the truck, for example, the vehicle ahead cannot actually be sensed. Thus, this controller functionality can also be described as determining whether the sensor for detecting a vehicle ahead has lost its target—meaning that the sensor is indeed functioning properly, but, because of the movement of the truck or traffic conditions, it is no longer capable of correctly recognizing a vehicle actually traveling ahead.

Also, as indicated above, autonomous braking is ended when the sensor for detecting a vehicle traveling ahead is transmitting signals and is therefore functional, but is not sensing any vehicle ahead (one cause of this can be roll, yaw and/or pitch of the truck). The controller checks the truck's speed at short time intervals, which can be shorter than one tenth of one second, for example, and, when the truck's speed is less than the most recently determined speed of a vehicle ahead, the controller terminates the autonomous braking, unless termination is overridden, as described hereinafter.

In one embodiment of the present invention, after autonomous braking has been triggered and when the sensor for detecting a vehicle traveling ahead is determined to be non-functional or functionally impaired, the electronic controller is adapted to permit autonomous braking to continue (to override the termination of autonomous braking) until the truck is at a standstill. The sensor for detecting a vehicle traveling ahead is to be understood as functionally impaired if it would not be capable, even under optimal conditions, of sensing a vehicle traveling ahead (e.g., if the truck has already collided with the vehicle ahead and the sensor has been destroyed as a result).

The electronic controller can also be adapted to determine the deceleration of a vehicle traveling ahead. In this case, it is possible to use, as the most recently determined speed of the vehicle ahead, an extrapolated speed of the vehicle ahead which is calculated under the assumption of constant deceleration. For this purpose, the time at which it was last possible to determine the speed of the vehicle ahead correctly is determined, and the difference between that time and the current time is calculated. This represents the time interval that has elapsed since it was last possible to determine the speed of the vehicle ahead. The speed of the vehicle ahead is then recalculated from this time and the most recently measured deceleration of the vehicle ahead.

Referring now to the accompanying drawing figure, FIG. 1 depicts a truck 10, which has a front end 12 and is traveling in a driving direction F on a schematically indicated roadway. A vehicle 16 driving ahead of and in the path of truck 10 can be sensed with a sensor 14, e.g., a video camera having a viewing field G. Sensor 14 is configured to not only sense vehicle 16, to deliver information as to whether a vehicle traveling ahead is present at all, but also to determine a distance "A" between front end 12 of truck 10 and a rear end of vehicle 16.

Truck 10 additionally comprises a sensor 18 for determining the truck's speed, e.g., a tachometer. Sensor 18 represents a driving-data sensing device that senses driving data in the form of a speed $v_F$ of truck 10.

Truck 10 additionally comprises a yaw-rate sensor 20 and a deceleration sensor 22, which can, for example, be part of a vehicle airbag system. Yaw-rate sensor 20 and deceleration sensor 22 are also driving-data sensors (sensing driving data in the form of a yaw rate and a deceleration/acceleration, respectively).

Driving-data sensors 18, 20, 22 are connected via electrical lines with an electronic controller 24. Electronic controller 24 includes a device 26 for determining the speed of a vehicle traveling ahead, which device is connected via electrical lines to video camera 14 and a laser sensor 28 in the form of a multi-beam laser sensor. It should be appreciated that laser sensor 28 is relatively more important than video camera 28 as regards functioning of the embodiment of the inventive driver assistance system depicted in FIG. 1—indeed, video camera 28 is not essential.

Within a time interval of 100 ms, for example, device 26 for measuring the speed of the vehicle ahead senses measured data of video camera 14 and/or of laser sensor 28 and calculates therefrom the distance A to vehicle 16. From changes in distance A, it additionally calculates the relative speed $v_{relative}$ between truck 10 and vehicle 16. Electronic controller 24 determines the speed $v_{vf}$ of vehicle 16 by adding the driving speed $v_K$ vector to the relative speed $v_{relative}$ vector. Alternatively, device 26 for determining the speed of the vehicle ahead is a Doppler radar sensor, with which the relative speed $v_{relative}$ is determined directly via the Doppler effect.

If electronic controller 24 senses, from one of the driving-data sensors 18, 20, 22, 14 or 28, driving data that correspond to predetermined brake-trigger driving data, it triggers autonomous braking of truck 10. The predetermined brake-trigger driving data are stored in a digital memory 30 of electronic controller 24. Autonomous braking is triggered when electronic controller 24 activates service brakes 32.1, 32.2, 32.3, 32.4 to brake truck 10 independently of inputs of a vehicle operator. It is also possible for one or more service brakes, such as, for example, six, to be present.

During autonomous braking, electronic controller 24 continually monitors the driving data of driving-data sensors 14, 18, 20, 22, 28, compares them with braking-termination driving data stored in digital memory 30 and terminates autonomous braking when the driving data correspond to the braking-termination driving data.

During operation of truck 10, electronic controller 24 senses the speed $v_{vf}(t)$ of vehicle 16 at regularly succeeding instants $t_1, t_2, \ldots$ and saves them in digital memory 30. If autonomous braking is triggered, electronic controller 24 determines whether video camera 14 or laser sensor 28 are transmitting signals that indicate whether the systems are functioning. If electronic controller 24 determines at an instant $t_n$ that video camera 14 and laser sensor 28 are indeed operational, but are not sensing any vehicle traveling ahead, it reads the most recently stored speed $v_{vf}(t_{n-1})$ of the vehicle ahead out of digital memory 30 and ends the autonomous braking when the vehicle speed $v_K$ is slower than the most recently measured speed $v_{vf}(t_{n-1})$ of the vehicle ahead.

If, after triggering autonomous braking, electronic controller 24 does not sense any kind of signals from video camera 14 or laser sensor 28, the electronic controller overrides termination of the autonomous braking until truck 10 is at a standstill. That is, the autonomous braking is continued until the truck is at a standstill. Thereafter, it is possible to continue holding service brakes 32 in braking position. Alternatively, it is possible to release the service brakes.

Accordingly, the present invention provides a vehicle driver assistance system that avoids premature termination of autonomous braking. In addition to a hard-wired solution, it should be appreciated that the present invention can be readily implemented in existing vehicle driver assistance systems through software modification (the programming techniques being within the ken of those of ordinary skill in the art).

It will thus be seen that the objects set forth above, among those made apparent from the preceding description, are efficiently attained, and since certain changes may be made in carrying out the above method without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A driver assistance system for a vehicle, comprising:
   a first sensor configured to sense the speed of the vehicle;
   a second sensor configured to sense a second vehicle traveling ahead of the vehicle;
   a third sensor configured to determine the speed of the second vehicle; and
   an electronic controller suitably programmed to:
   (i) trigger autonomous braking of the vehicle based on preselected data for triggering braking;
   (ii) determine the operational condition of the second sensor; and
   (iii) terminate autonomous braking of the vehicle when:
      (a) the second sensor is operational but is not sensing the second vehicle or any other vehicle ahead of the vehicle; and
      (b) the speed of the vehicle is less than the most recently determined speed of the second vehicle; and
   (iv) continue autonomous braking of the vehicle when the second sensor is nonoperational.

2. The driver assistance system according to claim 1, wherein the second sensor is configured to sense a distance between the vehicle and the second vehicle.

3. The driver assistance system according to claim 2, wherein the third sensor is configured to:
   (i) receive the speed of the vehicle from the first sensor;
   (ii) receive the distance from the second sensor; and
   (iii) calculate the speed of the second vehicle from the speed data and the distance data.

4. The driver assistance system according to claim 1, wherein the controller is further suitably programmed to override the termination of autonomous braking of the vehicle until the vehicle is at a standstill when the second sensor is nonoperational.

5. The driver assistance system according to claim 1, wherein the third sensor is a Doppler radar sensor.

6. The driver assistance system according to claim 1, further comprising at least one driving-data sensor for sensing driving data characteristics of a driving condition of the vehicle.

7. The driver assistance system according to claim 6, wherein the at least one driving-data sensor is at least one of a yaw-rate sensor and a deceleration sensor.

8. The driver assistance system according to claim 1, wherein the second sensor is at least one of a multi-beam laser sensor and a radar sensor.

9. The driver assistance system according to claim 8, wherein the radar sensor is a Doppler radar sensor.

10. The driver assistance system according to claim 1, wherein the second sensor includes a video camera.

11. The driver assistance system according to claim 1, wherein the electronic controller is suitably programmed to continually execute, during autonomous braking of the vehicle:
   (i) monitoring of the operational condition of the second sensor; and
   (ii) termination of autonomous braking of the vehicle when the second sensor is operational but is not sensing the second vehicle or any other vehicle ahead of the vehicle, and the speed of the vehicle is less than the most recently determined speed of the second vehicle.

12. A vehicle, comprising a driver assistance system according to claim 1.

13. In a vehicle including a driver assistance system having a first sensor configured to sense the speed of the vehicle, a second sensor configured to sense a second vehicle traveling ahead of the vehicle, a third sensor configured to determine the speed of the second vehicle, and an electronic controller suitably programmed to trigger autonomous braking of the vehicle based on preselected data for triggering braking, a method for avoiding premature termination of autonomous braking, the method comprising the steps of:
   (i) determining the operational condition of the second sensor;
   (ii) terminating autonomous braking of the vehicle when:
      (a) the second sensor is operational but is not sensing the second vehicle or any other vehicle ahead of the vehicle; and
      (b) the speed of the vehicle is less than the most recently determined speed of the second vehicle; and
   (iii) continuing autonomous braking of the vehicle when the second sensor is nonoperational.

14. The method according to claim 13, further comprising the step of overriding termination of autonomous braking of the vehicle until the vehicle is at a standstill when the second sensor is nonoperational.

15. The method according to claim 13, wherein the steps of:
   (i) determining the operational condition of the second sensor and
   (ii) terminating autonomous braking of the vehicle when
      (a) the second sensor is operational but is not sensing the second vehicle or any other vehicle ahead of the vehicle; and
      (b) the speed of the vehicle is less than the most recently determined speed of the second vehicle; and
   (iii) continuing autonomous braking of the vehicle when the second sensor is nonoperational are effected continually during autonomous braking of the vehicle.

\* \* \* \* \*